US009440315B2

(12) United States Patent
Yamashita et al.

(10) Patent No.: US 9,440,315 B2
(45) Date of Patent: Sep. 13, 2016

(54) ALUMINUM ALLOY HEAT EXCHANGER AND METHOD OF PRODUCING REFRIGERANT TUBE USED FOR THE HEAT EXCHANGER

(75) Inventors: Naoki Yamashita, Tokyo (JP); Yasunaga Itoh, Tokoyo (JP); Yuji Hisatomi, Tokyo (JP)

(73) Assignee: SUMITOMO LIGHT METAL INDUSTRIES, LTD., Tokyo (JP)

( * ) Notice: Subject to any disclaimer, the term of this patent is extended or adjusted under 35 U.S.C. 154(b) by 889 days.

(21) Appl. No.: 13/378,854

(22) PCT Filed: Jun. 21, 2010

(86) PCT No.: PCT/JP2010/060439
§ 371 (c)(1), (2), (4) Date: Mar. 6, 2012

(87) PCT Pub. No.: WO2010/150727
PCT Pub. Date: Dec. 29, 2010

(65) Prior Publication Data

US 2012/0145365 A1 Jun. 14, 2012

(30) Foreign Application Priority Data

Jun. 24, 2009 (JP) ................................ 2009-149518

(51) Int. Cl.

| | |
|---|---|
| ***B23K 35/362*** | (2006.01) |
| ***B23K 35/28*** | (2006.01) |
| ***B23K 35/36*** | (2006.01) |
| ***C22C 21/00*** | (2006.01) |
| ***C22C 21/02*** | (2006.01) |
| ***C22C 21/10*** | (2006.01) |
| ***C22C 21/14*** | (2006.01) |
| ***F28F 19/02*** | (2006.01) |
| ***F28F 21/08*** | (2006.01) |
| *F28D 21/00* | (2006.01) |

(52) U.S. Cl.
CPC .......... *B23K 35/362* (2013.01); *B23K 35/282* (2013.01); *B23K 35/3607* (2013.01); *C22C 21/00* (2013.01); *C22C 21/02* (2013.01); *C22C 21/10* (2013.01); *C22C 21/14* (2013.01); *F28F 19/02* (2013.01); *F28F 21/084* (2013.01); *B23K 2201/14* (2013.01); *F28D 2021/0084* (2013.01); *F28D 2021/0085* (2013.01)

(58) Field of Classification Search
CPC ... F28F 21/084; F28F 2275/02; F28F 21/089
USPC .......................... 148/437; 165/133; 228/183
See application file for complete search history.

(56) References Cited

U.S. PATENT DOCUMENTS

| | | | | |
|---|---|---|---|---|
| 4,955,525 | A * | 9/1990 | Kudo et al. | 228/183 |
| 5,820,698 | A * | 10/1998 | Tohma et al. | 148/24 |
| 7,250,223 | B2 * | 7/2007 | Miyachi et al. | 428/654 |
| 8,640,766 | B2 * | 2/2014 | Katsumata et al. | 165/133 |
| 2003/0015573 | A1 * | 1/2003 | Kawahara et al. | 228/183 |
| 2004/0131495 | A1 * | 7/2004 | Hasegawa et al. | 420/551 |
| 2006/0000586 | A1 * | 1/2006 | Katsumata et al. | 165/133 |
| 2006/0086486 | A1 * | 4/2006 | Sudo | 165/143 |

* cited by examiner

*Primary Examiner* — Judy Swann
*Assistant Examiner* — John Higgins
(74) *Attorney, Agent, or Firm* — Flynn, Thiel, Boutell & Tanis, P.C.

(57) ABSTRACT

An aluminum alloy heat exchanger is produced by applying a coating material that is prepared by adding a binder to a mixture of an Si powder and a Zn-containing compound flux powder to a surface of an aluminum alloy refrigerant tube, assembling a bare fin that is formed of an Al—Mn—Zn alloy with the refrigerant tube, and brazing the refrigerant tube and the bare fin by heating in an atmosphere-controlled furnace, the refrigerant tube being an extruded product of an aluminum alloy that comprises 0.5 to 1.7% (mass %, hereinafter the same) of Mn, less than 0.10% of Cu, and less than 0.10% of Si, with the balance being Al and unavoidable impurities, a mixing ratio of the Si powder to the Zn-containing compound flux powder being 10:90 to 40:60, the binder being added in an amount of 5 to 40% based on the total amount of the coating material, the coating material being applied to an outer surface of the refrigerant tube so that the total amount of the Si powder and the Zn-containing compound flux powder is 5 to 30 $g/m^2$, the surface of the refrigerant tube subjected to brazing having a potential lower than that of an area of the refrigerant tube that is deeper than a diffusion depth of Si and Zn by 20 to 200 mV, and a potential of the fin being lower than that of a deep area of the refrigerant tube.

5 Claims, No Drawings

ALUMINUM ALLOY HEAT EXCHANGER AND METHOD OF PRODUCING REFRIGERANT TUBE USED FOR THE HEAT EXCHANGER

BACKGROUND OF THE INVENTION

The present invention relates to an aluminum alloy heat exchanger, and a method of producing a refrigerant tube used for the heat exchanger.

An aluminum alloy that is lightweight and exhibits excellent thermal conductivity has been normally used for automotive heat exchangers (e.g., evaporator or condenser). Such a heat exchanger has been normally produced by applying a fluoride flux to the surface of an aluminum alloy extruded tube (i.e., refrigerant tube), assembling a member (e.g., fin material) on the aluminum alloy extruded tube to form a given structure, and brazing the materials in a heating furnace under an inert gas atmosphere, for example.

A refrigerant tube of automotive heat exchangers is normally formed using an aluminum multi-port extruded tube that has a plurality of hollow portions that are defined by a plurality of partition walls. In recent years, since a reduction in weight of heat exchangers has been desired to reduce the fuel consumption of automobiles from the viewpoint of reducing environmental impact, a refrigerant tube has been reduced in thickness. Therefore, the cross-sectional area of the refrigerant tube has further decreased, and a several hundred to several thousand extrusion ratio (cross-sectional area of container/cross-sectional area of extruded product) has been employed. Therefore, a pure aluminum material that exhibits excellent extrudability has been used as the tube material.

It is expected that heat exchangers will be further reduced in weight, and tubes will be further reduced in weight. In this case, it is necessary to increase the strength of the tube material. In recent years, $CO_2$ (natural refrigerant) has been used instead of a fluorocarbon in order to prevent global warming. A $CO_2$ refrigerant requires a high operating pressure as compared with a fluorocarbon refrigerant. This also makes it necessary to increase the strength of the tube material.

It is effective to add Si, Cu, Mn, Mg, etc. in order to increase the strength of the tube material. When the brazing target material contains Mg, a fluoride flux that is melted during heating reacts with Mg in the material to produce compounds such as $MgF_2$ and $KMgF_3$. This reduces the activity of the flux, so that brazability significantly deteriorates. The operating temperature of a heat exchanger using a $CO_2$ refrigerant reaches as high as about 150° C. Therefore, intergranular corrosion susceptibility significantly increases when the material contains Cu. The refrigerant leaks at an early stage when intergranular corrosion has occurred, and impairs the function of the tube of the heat exchanger.

Therefore, Si and Mn must be added in order to increase the strength of the tube material. When adding Mn and Si to an alloy at a high concentration, Mn and Si dissolved in the matrix increase the deformation resistance of the alloy. For example, when a several hundred to several thousand extrusion ratio is employed (e.g., when producing a multi-port extruded tube), the alloy exhibits significantly inferior extrudability as compared with a pure Al material. An alloy that requires a high extrusion ram pressure or has a low critical extrusion rate (i.e., the maximum extrusion rate obtained without causing breakage of the partition wall of the hollow portion of the multi-port tube) exhibits inferior extrudability. An alloy containing Mn and Si at a high concentration requires a ram pressure higher than that of a pure Al material, so that the die tends to break or wear. Moreover, productivity decreases due to a decrease in critical extrusion rate.

For example, a method that adds Si and Mn that increase strength, and performs a high-temperature homogenization treatment and a low-temperature homogenization treatment in order to improve extrudability to reduce the amount of solute elements dissolved in the matrix and reduce the deformation resistance has been proposed. In this case, since an amount of solute elements is added, an improvement in extrudability (particularly an improvement in extrusion rate) is limited although an increase in strength may be achieved. Specifically, it is difficult to achieve a high strength and high extrudability (i.e., productivity) at the same time.

A refrigerant leaks from a refrigerant tube of an automotive heat exchanger when perforation corrosion has occurred during use. Therefore, Zn is caused to adhere to the surface of an extruded refrigerant tube by thermal spraying or the like, and is diffused by brazing. A Zn diffusion layer formed in the surface of the tube serves as a sacrificial anode for the deeper area, and suppresses corrosion in the thickness direction to increase the perforation life. In this case, a Zn application step (e.g., Zn thermal spraying) is required after extruding the tube. Moreover, a step of applying a fluoride flux required for brazing, or a step of applying a flux to the entire heat exchanger core must be performed after the Zn application step. This increases the production cost. Since the tube is not provided with a filler metal, it is necessary to use a brazing fin that is clad with a filler metal. This also increases cost as compared with the case of using a bare fin material that is not clad with a filler metal.

As a method that solves these problems, a method that applies a mixture of a filler metal powder and a Zn-containing flux powder to the surface of an aluminum alloy extruded refrigerant tube has been proposed. In this case, since the filler metal, Zn, and the flux can be simultaneously applied by a single step, the cost can be reduced. Moreover, since a bare fin material can be used, the cost can be further reduced. However, the above method does not necessarily provide the refrigerant tube with strength, extrudability, and corrosion resistance. A refrigerant tube that contains 0.5 to 1.0% of Si and 0.05 to 1.2% of Mn has also been proposed. In this case, a high strength may be achieved due to a large amount of solute elements, but an improvement in extrudability (particularly extrusion rate) is limited. Specifically, it is difficult to achieve a high strength and high extrudability (i.e., productivity) in combination.

JP-A-2005-256166, JP-A-2006-255755, JP-A-2006-334614, and JP-A-2004-330233 disclose related-art technologies.

SUMMARY OF THE INVENTION

The present invention was conceived to solve the above problems relating to automotive heat exchangers and aluminum refrigerant tubes. An object of the present invention is to provide an aluminum alloy heat exchanger that exhibits a high corrosion resistance, enables a further reduction in weight and cost, and is suitable as an automotive heat exchanger by utilizing a refrigerant tube that is formed of an aluminum alloy that exhibits an excellent strength and corrosion resistance after brazing, and has improved extrudability. Another object of the present invention is to provide a method of producing a refrigerant tube that improves the extrudability of an aluminum alloy that forms a refrigerant tube used for the above heat exchanger.

According to a first aspect of the present invention, there is provided an aluminum alloy heat exchanger that is produced by applying a coating material that is prepared by adding a binder to a mixture of an Si powder and a Zn-containing compound flux powder to a surface of an aluminum alloy refrigerant tube, assembling a bare fin that is formed of an Al—Mn—Zn alloy with the refrigerant tube, and brazing the refrigerant tube and the bare fin by heating in an atmosphere-controlled furnace, the refrigerant tube being an aluminum alloy extruded product that comprises 0.5 to 1.7% (mass %, hereinafter the same) of Mn, less than 0.10% of Cu, and less than 0.10% of Si, with the balance being Al and unavoidable impurities, a mixing ratio of the Si powder to the Zn-containing compound flux powder being 10:90 to 40:60, the binder being added in an amount of 5 to 40% based on the total amount of the coating material, the coating material being applied to an outer surface of the refrigerant tube so that the total amount of the Si powder and the Zn-containing compound flux powder is 5 to 30 g/m$^2$, the surface of the refrigerant tube subjected to brazing having a potential lower than that of an area of the refrigerant tube that is deeper than a diffusion depth of Si and Zn by 20 to 200 mV, and a potential of the fin being lower than that of the area of the refrigerant tube that is deeper than the diffusion depth of Si and Zn.

In the above aluminum alloy heat exchanger, the aluminum alloy extruded product may further comprise at least one of 0.30% or less of Ti, 0.10% or less of Sr, and 0.3% or less of Zr.

In the above aluminum alloy heat exchanger, the Zn-containing compound flux powder may be $KZnF_3$.

In the above aluminum alloy heat exchanger, the Al—Mn—Zn alloy may comprise 0.1 to 1.8% of Mn, 0.8 to 3.0% of Zn, and at least one of 0.1 to 1.2% of Si, 0.01 to 0.8% of Fe, 0.05 to 0.5% of Mg, 0.3% or less of Cu, 0.3% or less of Cr, 0.3% or less of Zr, and 0.3% or less of Ti, with the balance being Al and unavoidable impurities.

In the above aluminum alloy heat exchanger, the Al—Mn—Zn alloy may further comprise at least one of 0.001 to 0.10% of In and 0.001 to 0.10% of Sn.

According to a second aspect of the present invention, there is provided a method of producing a refrigerant tube that is used for the above aluminum alloy heat exchanger, the method comprising subjecting an ingot of the aluminum alloy that forms the refrigerant tube to a homogenization heat treatment that holds the ingot at 400 to 650° C. for 4 hours or more, and hot-extruding the ingot.

According to a third aspect of the present invention, there is provided a method of producing a refrigerant tube that is used for the above aluminum alloy heat exchanger, the method comprising subjecting an ingot of the aluminum alloy that forms the refrigerant tube to a homogenization heat treatment, and hot-extruding the ingot, the homogenization heat treatment including a first-stage heat treatment that holds the ingot at 570 to 650° C. for 2 hours or more, and a second-stage heat treatment that holds the ingot at 400 to 550° C. for 3 hours or more.

According to a fourth aspect of the present invention, there is provided a method of producing a refrigerant tube that is used for the above aluminum alloy heat exchanger, the method comprising subjecting an ingot of the aluminum alloy that forms the refrigerant tube to a homogenization heat treatment, and hot-extruding the ingot, the homogenization heat treatment including a first-stage heat treatment that holds the ingot at 570 to 650° C. for 2 hours or more, followed by cooling the ingot to 200° C. or less, and a second-stage heat treatment that holds the ingot at 400 to 550° C. for 3 hours or more.

The present invention thus provides an aluminum alloy heat exchanger that exhibits high corrosion resistance, enables a further reduction in weight and cost, and is suitable as an automotive heat exchanger by utilizing a refrigerant tube that is formed of an aluminum alloy that exhibits excellent strength and corrosion resistance after brazing, and has improved extrudability. The present invention thus also provides a method of producing a refrigerant tube that improves the extrudability of an aluminum alloy that forms a refrigerant tube used for the above heat exchanger.

DESCRIPTION OF EXEMPLARY EMBODIMENTS

The effects and the reasons for limitations of the alloy components of the extruded product of the aluminum alloy that forms the refrigerant tube of the aluminum alloy heat exchanger according to the present invention are described below.

Mn:

Mn is dissolved in the matrix after brazing the heat exchanger so that the strength of the aluminum alloy can be increased as compared with a pure aluminum alloy that has been used to form a multi-port extruded tube for automotive heat exchangers. The addition of Mn decreases extrudability (particularly the critical extrusion rate) to only a small extent as compared with the case of adding the same amount of Si, Cu, or Mg. When adding an identical amount of Mn, Si, Cu, or Mg to obtain an identical strength, a decrease in critical extrusion rate is a minimum when adding Mn so that high strength and high extrudability (i.e., productivity) can be achieved in combination. The Mn content is preferably 0.5 to 1.7%. If the Mn content is less than 0.5%, an increase in strength may occur to only a small extent. If the Mn content exceeds 1.7%, extrudability may decrease. The Mn content is more preferably 0.6 to 1.5%.

Si:

The Si content is limited to less than 0.10%. This achieves the following effects. The Si powder applied to the surface of the refrigerant tube diffuses into the refrigerant tube during brazing, forms an Al—Mn—Si intermetallic compound with Mn included in the aluminum alloy that forms the refrigerant tube, and precipitates. The solid solubility of Mn and Si in the Si diffusion layer of the refrigerant tube decreases due to precipitation, so that the potential of the Si diffusion layer becomes lower than that of an area deeper than the Si diffusion layer (i.e., an area in which Si is not diffused). As a result, an area of the refrigerant tube from the surface to the bottom of the Si diffusion layer serves as a sacrificial anode layer for an area that is deeper than the Si diffusion layer, so that the corrosion perforation life in the depth direction can be improved.

If the Si content is 0.10% or more, since an Al—Mn—Si metal compound is initially present in the aluminum alloy that forms the refrigerant tube, the solid solubility of Mn in the alloy decreases. In this case, even if the Si powder applied to the surface diffuses into the alloy during brazing, precipitation of Al—Mn—Si intermetallic compounds decreases, so that the effect of lowering the potential of the Si diffusion layer decreases. Therefore, an area of the refrigerant tube from the surface to the bottom of the Si diffusion layer does not serve as a sacrificial anode layer (i.e., the corrosion perforation life is not improved). The Si content is more preferably 0.05% or less in order to reliably achieve the above effect.

Cu:

The Cu content is limited to less than 0.10%. This achieves the following effects (1) to (3).

(1) Intergranular corrosion can be suppressed during use of a brazed automotive heat exchanger (particularly at a high temperature). If the Cu content is 0.10% or more, the operating temperature of a heat exchanger increases to about 150° C. particularly when using $CO_2$ as a refrigerant, so that precipitation of Cu or the like significantly occurs at the grain boundary. As a result, the intergranular corrosion susceptibility increases.

(2) The addition of Cu significantly decreases extrudability as compared with Mn. It is also necessary to limit the amount of Cu taking account of a decrease in extrudability.

(3) It is known that a potential decreases due to the addition of Zn, and increases due to the addition of Cu. The inventors found that the potential-increasing effect of Cu predominantly occurs when Zn coexists with Cu (particularly when the Zn content is low). In the present invention, a Zn diffusion layer formed during brazing with the Zn-containing flux powder has a low surface Zn concentration as compared with a Zn diffusion layer formed during brazing by Zn thermal spraying, etc. Therefore, if the refrigerant tube contains 0.10% or more of Cu, the potential-decreasing effect of the Zn diffusion layer formed by the Zn-containing flux powder is counterbalanced by the potential-increasing effect of Cu. In this case, the potential of the surface of the refrigerant tube does not decrease in spite of the presence of the Zn diffusion layer, so that a potential gradient cannot be formed such that the surface has a lower potential and the deep area has a higher potential in the thickness direction of the refrigerant tube. This makes it difficult to protect the deep area from corrosion by utilizing the surface as a sacrificial anode to improve the perforation life. An Si diffusion layer is present in the surface of the refrigerant tube due to the applied Si powder, and increases the potential of the surface. When the Cu content is high, the potential-increasing effect of Cu becomes completely predominant over the potential-decreasing effect of the Zn diffusion layer, so that a potential gradient is formed such that the surface has a higher potential and the deep area has a lower potential in the thickness direction of the refrigerant tube along with the potential-increasing effect of the Si diffusion layer. In this case, since the deep area serves as an anode with respect to the surface of the refrigerant tube, perforation corrosion occurs at an early stage. The surface Zn concentration may be increased by increasing the deposition amount of the Zn-containing flux powder. However, this increases the thickness of the resulting film. In this case, the thickness of the film decreases during brazing due to melting of Si and the flux so that the distance between the refrigerant tube and the fin material decreases. Since the above phenomenon occurs over the entire core, the outer dimension of the core decreases. When the Cu content is limited to less than 0.10%, the potential of the surface of the refrigerant tube decreases due to the low-concentration Zn diffusion layer. Therefore, a potential distribution in the thickness direction can be formed such that the surface has a lower potential and the deep area has a higher potential. This protects the deep area against corrosion by utilizing the surface of the refrigerant tube as a sacrificial anode. The Cu content is more preferably less than 0.05%, and still more preferably 0.03% or less.

Ti, Sr, and Zr:

Ti forms a high-Ti-concentration area and a low-Ti-concentration area in the alloy. These areas are alternately distributed in layers in the direction of the thickness of the material. Since the low-Ti-concentration area is preferentially corroded as compared with the high-Ti-concentration area, corrosion occurs in a layered manner. Therefore, corrosion does not proceed in the thickness direction of the material, so that pitting corrosion resistance and intergranular corrosion resistance are improved. Moreover, the strength of the material at room temperature and a high temperature is improved by adding Ti. The Ti content is preferably 0.30% or less. If the Ti content exceeds 0.30%, coarse crystallized products may be produced during casting. This may make it difficult to produce a sound refrigerant tube.

Sr causes the Si powder applied to the surface of the refrigerant tube to react with Al in the matrix during brazing to produce an Al—Si alloy liquid filler metal, and causes the crystallized eutectic structure to be refined and dispersed during solidification due to cooling. When the eutectic structure that serves as an anode site on the surface of the material is dispersed, corrosion is uniformly dispersed, so that a planar corrosion configuration is obtained. This improves corrosion resistance. The Sr content is preferably 0.10% or less. If the Sr content exceeds 0.10%, an Al—Si—Sr compound may be crystallized, so that the eutectic structure may not be refined.

Zr increases the size of recrystallized grains when the alloy that forms the refrigerant tube recrystallizes during brazing. This reduces the grain boundary density of the matrix, suppresses a phenomenon in which the Al—Si alloy liquid filler metal produced by the Si powder applied to the surface of the refrigerant tube penetrates the grain boundaries of the matrix, and suppresses preferential intergranular corrosion. The Zr content is preferably 0.30% or less. If the Zr content exceeds 0.30%, coarse crystallized products may be produced during casting. This may make it difficult to produce a sound refrigerant tube. The effects of Ti, Sr, and Zr can be obtained in combination by adding Ti, Sr, and Zr in combination.

The extruded product of the aluminum alloy that forms the refrigerant tube of the aluminum alloy heat exchanger according to the present invention is preferably produced as follows. An aluminum alloy having the above composition is melted, and cast to obtain an ingot. The ingot is subjected to a homogenization treatment that holds the ingot at 400 to 650° C. for 4 hours or more, and hot-extruded. The homogenization treatment causes coarse crystallized products formed during casting and solidification to be decomposed, or granulated, so that a non-uniform texture (e.g., segregation layer) produced during casting can be homogenized. When coarse crystallized products or a non-uniform texture (e.g., segregation layer) produced during casting remain during hot extrusion, extrudability may decrease, or the surface roughness of the extruded product may decrease. If the homogenization temperature is less than 400° C., the above effects may not be obtained. The above effects are more easily obtained as the homogenization temperature increases. If the homogenization temperature is more than 650° C., melting may occur. The homogenization temperature is more preferably 430 to 620° C. The homogenization time is preferably 10 hours or more in order to achieve a sufficient effect. The effect of the homogenization treatment may be saturated (i.e., uneconomical) even if the homogenization treatment is performed for more than 24 hours. Therefore, the homogenization time is preferably 10 to 24 hours.

The ingot may be subjected to a high-temperature homogenization treatment and a low-temperature homogenization treatment in combination. This further improves hot-extrudability, and reduces aluminum refuse. The term "aluminum refuse" refers to a defect wherein aluminum pieces accumulated in the die during extrusion are discharged from the die when a given size is reached, and adhere to the surface of the refrigerant tube aluminum extruded product. The high-temperature homogenization treatment (first-stage heat treatment) holds the ingot at 570 to 650° C. for 2 hours or more. This treatment causes coarse crystallized products formed during casting and solidification to be decomposed, granulated, or redissolved. If the treatment temperature is less than 570° C., redissolution may proceed to only a small extent. It is effective to employ a high homogenization temperature. However, melting may occur if the homogenization temperature is too high. Therefore, the homogenization temperature is set to be 650° C. or less. The homogenization temperature is more preferably 580 to 620° C. The homogenization time is preferably 5 to 24 hours. The effect of the homogenization treatment may be saturated (i.e., uneconomical) even if the homogenization treatment is performed for more than 24 hours.

When performing a homogenization treatment (second-stage heat treatment) after the high-temperature homogenization treatment (first-stage heat treatment) at a temperature lower than that of the high-temperature homogenization treatment, Mn dissolved in the matrix precipitates, so that the solid solubility of Mn decreases. This reduces deformation resistance during the subsequent hot extrusion, so that extrudability can be improved. The temperature of the low-temperature homogenization treatment (second-stage heat treatment) is preferably 400 to 550° C. If the temperature of the low-temperature homogenization treatment (second-stage heat treatment) is less than 400° C., since only a small amount of Mn precipitates, the effect of reducing the deformation resistance may be insufficient. If the temperature of the low-temperature homogenization treatment (second-stage heat treatment) exceeds 550° C., precipitation may occur to only a small extent, so that the effect of reducing the deformation resistance may be insufficient. The low-temperature homogenization treatment (second-stage heat treatment) is performed for 3 hours or more. If the treatment time is less than 3 hours, precipitation may not sufficiently occur, so that the effect of reducing the deformation resistance may be insufficient. The effect of the low-temperature homogenization treatment (second-stage heat treatment) may be saturated (i.e., uneconomical) even if the homogenization treatment is performed for more than 24 hours. The low-temperature homogenization treatment (second-stage heat treatment) is preferably performed for 5 to 15 hours. The above two-stage homogenization treatment is designed so that Mn that has been sufficiently and homogeneously dissolved by the first-stage heat treatment is precipitated by the second-stage heat treatment. The first-stage heat treatment and the second-stage heat treatment need not necessarily be performed consecutively. Specifically, the second-stage heat treatment may be performed immediately after the first-stage heat treatment, or may be performed after cooling the ingot subjected to the first-stage heat treatment to 200° C. or less.

Mixture of Si Powder, Zn-Containing Compound Flux Powder, and Binder

When brazing the aluminum alloy heat exchanger according to the present invention, a coating material that is prepared by adding a binder to a mixture of an Si powder and a Zn-containing compound flux powder is applied to the surface of the refrigerant tube. The following effects are achieved by applying the coating material. Specifically, the Si powder reacts with Al of the matrix of the refrigerant tube during brazing to produce an Al—Si filler metal, so that a fin material or a header material can be bonded to the refrigerant tube. The Zn-containing flux decomposes into the flux and Zn during brazing. The flux enables brazing, and Zn diffuses into the refrigerant tube to form a Zn diffusion layer. A potential gradient can thus be formed so that the surface of the refrigerant tube has a lower potential and the deep area of the refrigerant tube has a higher potential. Therefore, the deep area can be protected against corrosion by utilizing the surface area as a sacrificial anode. The binder improves adhesion when causing the mixed powder to adhere to the refrigerant tube. The particle size of the Si powder included in the mixture of the Si powder and the Zn-containing compound flux powder is preferably 100 μm or less, more preferably 30 μm or less, and still more preferably 15 μm or less. The fluidity of the Al—Si liquid filler metal produced during brazing is improved as the particle size of the Si powder decreases. Moreover, erosion of the matrix is suppressed as the particle size of the Si powder decreases. It is preferable that the Zn-containing compound flux powder have an average particle size of about 5 μm. For example, $KZnF_3$ is used as the Zn-containing compound flux powder.

The mixing ratio of the Si powder to the Zn-containing compound flux powder is preferably 10:90 to 40:60. If the mixing ratio is less than 10:90 (i.e., the amount of the Si powder is less than 10%), a sufficient liquid filler metal may not be produced during brazing, so that bonding failure may occur. If the mixing ratio is more than 40:60 (i.e., the amount of the Si powder is more than 40%), the amount of Zn diffused into the refrigerant tube may be insufficient. Moreover, brazability may deteriorate due to a decrease in the amount of flux.

When applying the mixture to the surface of the refrigerant tube, adhesion is improved by applying the mixture as a coating material that is prepared by adding a binder (e.g., a resin that volatilizes during heating for brazing) to the mixture. For example, an acrylic resin is used as the binder. The binder is used in an amount of 5 to 40% based on the total amount of the coating material. If the amount of the binder is less than 5% based on the total amount of the coating material, the mixture may easily separate from the surface of the refrigerant tube. If the amount of the binder is more than 40% based on the total amount of the coating material, brazability may deteriorate.

The mixture of the Si powder and the Zn-containing compound flux powder is preferably applied in an amount of 5 to 30 $g/m^2$. If the amount of the mixture applied is less than 5 $g/m^2$, the amount of Zn that adheres to the surface of the refrigerant tube may be insufficient. If the amount of the mixture applied is more than 30 $g/m^2$, the amount of filler metal produced may increase, so that melting or dissolution of the fin or the matrix may easily occur. Moreover, since the thickness of the film between the refrigerant tube and the fin material increases, the dimensions of the entire core may decrease if the film is melted during brazing and is reduced in thickness. The mixture may be applied to the refrigerant tube by roll coating.

Potential Difference Between the Surface and Deep Area of Refrigerant Tube and Relationship with Potential of Fin Material In the aluminum alloy heat exchanger according to the present invention, the surface of the refrigerant tube has a potential lower than that of an area of the refrigerant tube that is deeper than a diffusion depth of Si and Zn by 20 to 200 mV, and the potential of the fin is lower than that of the deep area of the refrigerant tube. Therefore, the surface of the refrigerant tube serves as a sacrificial anode with respect to the deep area so that the deep area can be cathodically protected. If the potential difference is smaller than 20 mV, a sufficient sacrificial anode effect may not be obtained. If the potential difference is larger than 200 mV, the corrosion rate of the surface area increases, so that the sacrificial anode may be quickly exhausted. It is also important that the potential of the fin be lower than that of the deep area of the refrigerant tube. If the potential of the fin is higher than that of the deep area of the refrigerant tube, the fin serves as a cathode with respect to the refrigerant tube, so that corrosion of the refrigerant tube is promoted. Therefore, the potential of the fin must be lower than that of the deep area of the refrigerant tube.

When producing a heat exchanger using the refrigerant tube according to the present invention, defective brazing that may occur at a joint between the refrigerant tube and a header material can be suppressed. Specifically, the refrigerant tube and the header material are mainly bonded via a filler metal applied to the header material. However, the Si powder adheres to the surface of the refrigerant tube, and the joint is covered with a liquid filler metal that is produced by the Si powder and the surface area of the refrigerant tube that are melted during brazing. Therefore, the filler metal of the header material communicates with the liquid filler metal on the surface of the refrigerant tube (i.e., flows freely). The refrigerant tube is bonded to the fin on the side opposite to the header, and the filler metal of the header material moves along the surface of the refrigerant tube, and reaches the joint with the fin due to surface tension. Therefore, the amount of filler metal becomes insufficient at the joint between the header and the refrigerant tube, so that defective brazing occurs. In particular, defective brazing occurs when using a refrigerant tube formed of a pure aluminum alloy or an alloy produced by adding Cu to a pure aluminum alloy. On the other hand, when forming a refrigerant tube using the aluminum alloy according to the present invention, defective brazing does not occur at the joint between the refrigerant tube and the header material even when the header material is provided with the same amount of filler metal as in the case of using the refrigerant tube formed of the above alloy. Specifically, since an Al—Mn precipitate (resistance) is present on the surface of the refrigerant tube aluminum alloy according to the present invention, the wettability of the liquid filler metal with the surface of the aluminum alloy can be suppressed as compared with a pure aluminum alloy or an alloy produced by adding Cu to a pure aluminum alloy. This makes it possible to prevent a situation in which the filler metal of the header material moves along the surface of the refrigerant tube and flows into the joint with the fin. In the present invention, since the refrigerant tube is bonded to the fin material through the mixture of the Si powder and the Zn-containing flux that is applied to the surface of the refrigerant tube, it is possible to reduce the Zn concentration of the fillet at the joint with the fin material as compared with the case of applying Zn to the surface of the refrigerant tube by thermal spraying or the like. Therefore, preferential corrosion of the fillet at the joint with the fin can be suppressed, so that removal of the fin can be prevented.

The effects and the reasons for limitations of the alloy components of the aluminum alloy that forms the bare fin material of the aluminum alloy heat exchanger according to the present invention are described below.

Mn:

Mn improves the strength of the fin material. The Mn content is preferably 0.1 to 1.8%. If the Mn content is less than 0.1%, the effect may be insufficient. If the Mn content exceeds 1.8%, coarse crystallized products may be produced during casting. This may make it difficult to produce a sound fin material. The Mn content is more preferably 0.8 to 1.7%.

Zn:

Zn decreases the potential of the fin material. The Zn content is preferably 0.8 to 3.0%. If the Zn content is less than 0.8%, a sufficient potential-decreasing effect may not be obtained. If the Zn content exceeds 3.0%, the potential of the fin material is sufficiently decreased, but the self-corrosion resistance of the fin material may decrease. Moreover, since the potential difference between the fin and the deep area of the refrigerant tube increases, the fin (anode) may be consumed at an early stage due to corrosion in an environment in which the material is always exposed to a high-conductivity liquid. The Zn content is more preferably 1.0 to 2.5%.

Si, Fe, Cu, Mg, Cr, Zr, and Ti:

Si improves the strength of the fin material. The Si content is preferably 0.1 to 1.2%. If the Si content is less than 0.1%, the effect may be insufficient. If the Si content exceeds 1.2%, the melting point of the fin material may decrease, so that local melting may occur during brazing. The Si content is more preferably 0.2 to 0.6%.

Fe improves the strength of the fin material. The Fe content is preferably 0.01 to 0.8%. If the Fe content is less than 0.01%, the effect may be insufficient. If the Fe content exceeds 0.8%, the amount of Al—Fe compounds produced may increase, so that the self-corrosion resistance of the fin material may decrease. The Fe content is more preferably 0.1 to 0.7%.

Mg improves the strength of the fin material. The Mg content is preferably 0.05 to 0.5%. If the Mg content is less than 0.05%, the effect may be insufficient. If the Mg content exceeds 0.5%, Mg reacts with a fluoride flux to produce magnesium fluoride during brazing in an inert gas atmosphere using a fluoride flux. As a result, brazability may decrease, and the appearance of the brazed area may deteriorate. The Mg content is more preferably 0.05 to 0.3%, and still more preferably 0.05 to 0.15%.

Cu improves the strength of the fin material. The Cu content is preferably 0.3% or less. If the Cu content exceeds 0.3%, the potential of the fin material may increase, so that the corrosion resistance of the refrigerant tube may be impaired. Moreover, the self-corrosion resistance of the fin material may decrease.

Cr and Zr increase the grain size after brazing, and reduce buckling of the fin during brazing. The Cr content and the Zr content are preferably 0.3% or less. If the Cr content or the Zr content exceeds 0.3%, coarse crystallized products may be produced during casting. This may make it difficult to produce a sound fin material.

Ti forms a high-Ti-concentration area and a low-Ti-concentration area in the alloy. These areas are alternately distributed in layers in the direction of the thickness of the material. Since the low-Ti-concentration area is preferentially corroded as compared with the high-Ti-concentration area, corrosion occurs in a layered manner. Therefore, corrosion does not proceed in the thickness direction of the material. As a result, pitting corrosion resistance and intergranular corrosion resistance are improved. Moreover, the strength of the material at room temperature and a high temperature is improved by adding Ti. The Ti content is preferably 0.3% or less. If the Ti content exceeds 0.3%, coarse crystallized products may be produced during casting. This may make it difficult to produce a sound fin material.

In and Sn:

In and Sn decrease the potential of the fin material with a small amount of addition. In and Sn exhibit a sacrificial anode effect for the refrigerant tube, and prevent pitting corrosion of the refrigerant tube. The In content and the Sn content are preferably 0.001 to 0.1%. If the In content or the Sn content is less than 0.001%, the effect may be insufficient. If the In content or the Sn content exceeds 0.1%, the self-corrosion resistance of the fin material may decrease.

The heat exchanger according to the present invention may be produced by assembling the refrigerant tube and the fin material having the above composition, and brazing the refrigerant tube and the fin material by a normal method. The production method is not particularly limited. The heat exchanger according to the present invention exhibits an excellent corrosion resistance and exhibits an excellent durability, even when installed in an automobile that is subjected to a severe corrosive environment, for example. The heating method and the structure of the heating furnace used when subjecting the aluminum alloy that forms the refrigerant tube to the homogenization treatment are not particularly limited. The shape of the aluminum alloy extruded product that forms the refrigerant tube is not particularly limited. The extrusion shape is determined depending on the application (e.g., the shape of the heat exchanger). Since the material has excellent extrudability, the material may be extruded using a multi-cavity die having a hollow shape. For example, the refrigerant tube for heat exchangers is normally assembled with another member (e.g., fin material or header material), followed by brazing. The brazing atmosphere, the heating temperature, heating time and brazing method are not particularly limited. The fin material is normally produced by producing an ingot by semi-continuous casting, and subjecting the ingot to hot rolling, cold rolling, process annealing, and cold rolling. Note that process annealing may be omitted. A hot-rolled sheet may be directly obtained from a molten metal by continuous casting and rolling, and may be cold-rolled.

EXAMPLES

An aluminum alloy extruded product for a refrigerant tube was produced as follows. A billet of an aluminum alloy (Alloys A to L) having a composition shown in Table 1 or an aluminum alloy (Alloys M to T) having a composition shown in Table 2 was cast. Alloy T has been widely used. The resulting billet was subjected to the following tests 1, 2, and 3. In Table 2, a value that does not meet the requirements of the present invention is underlined.

Test 1

The cast billet was homogenized at 600° C. for 10 hours, and hot-extruded to obtain a multi-port tube. The critical extrusion rate ratio (relative ratio with respect to the critical extrusion rate of Alloy T) during extrusion was determined. The results are shown in Tables 3 and 4. A case where the critical extrusion rate ratio was more than 1.0 was evaluated as "Good", and a case where the critical extrusion rate ratio was less than 1.0 was evaluated as "Bad" (extrudability evaluation).

Test 2

The multi-port tube extruded in Test 1 was brazed. The multi-port tube was heated to 600° C. in a nitrogen gas atmosphere at an average temperature increase rate of 50° C./min, held for 3 minutes, and cooled to room temperature. The multi-port tube was then subjected to a tensile test at room temperature. The results (tensile strength) are shown in Tables 3 and 4. A case where the tensile strength was higher than that of Alloy T was evaluated as "Good", and a case where the tensile strength was lower than that of Alloy T was evaluated as "Bad" (evaluation of strength after brazing).

Test 3

The billets of Alloys C and D were homogenized under conditions shown in Tables 5 and 6, and hot-extruded to obtain multi-port tubes. The critical extrusion rate ratio (relative ratio with respect to the critical extrusion rate of Alloy T) was determined. The temperature increase rate was 50° C./h. The temperature decrease rate when successively performing the first-stage heat treatment and the second-stage heat treatment was 25° C./h. The billet was allowed to cool after the second-stage heat treatment. The results (critical extrusion rate ratio) are shown in Tables 5 and 6. A case where the critical extrusion rate ratio was more than 1.0 was evaluated as "Good", and a case where the critical extrusion rate ratio was less than 1.0 was evaluated as "Bad" (extrudability evaluation).

TABLE 1

| | Composition (mass %) | | | | | | |
|---|---|---|---|---|---|---|---|
| Alloy | Si | Fe | Cu | Mn | Ti | Sr | Zr |
| A | 0.05 | 0.15 | 0 | 0.5 | 0 | 0 | 0 |
| B | 0.05 | 0.15 | 0 | 1.7 | 0 | 0 | 0 |
| C | 0.05 | 0.15 | 0 | 1.0 | 0 | 0 | 0 |
| D | 0.05 | 0.15 | 0 | 0.7 | 0 | 0 | 0 |
| E | 0.05 | 0.15 | 0 | 0.7 | 0.15 | 0 | 0 |
| F | 0.05 | 0.15 | 0 | 0.7 | 0 | 0.03 | 0 |
| G | 0.05 | 0.15 | 0 | 0.7 | 0 | 0 | 0.15 |
| H | 0.05 | 0.15 | 0 | 0.7 | 0.15 | 0.03 | 0 |
| I | 0.05 | 0.15 | 0 | 0.7 | 0 | 0.03 | 0.15 |
| J | 0.05 | 0.15 | 0 | 0.7 | 0.15 | 0 | 0.15 |
| K | 0.05 | 0.15 | 0 | 0.7 | 0.15 | 0.03 | 0.15 |
| L | 0.05 | 0.15 | 0.03 | 0.7 | 0 | 0 | 0 |

TABLE 2

| | Composition (mass %) | | | | | | |
|---|---|---|---|---|---|---|---|
| Alloy | Si | Fe | Cu | Mn | Ti | Sr | Zr |
| M | 0.05 | 0.15 | 0 | 0.4 | 0 | 0 | 0 |
| N | 0.05 | 0.15 | 0 | 1.8 | 0 | 0 | 0 |
| O | 0.05 | 0.15 | 0 | 0.7 | 0.35 | 0 | 0 |
| P | 0.05 | 0.15 | 0 | 0.7 | 0 | 0.20 | 0 |
| Q | 0.05 | 0.15 | 0 | 0.7 | 0 | 0 | 0.35 |
| R | 0.05 | 0.15 | 0.15 | 0.7 | 0 | 0 | 0 |
| S | 0.05 | 0.15 | 0.01 | 0.01 | 0 | 0 | 0 |
| T | 0.05 | 0.15 | 0.4 | 0.1 | 0 | 0 | 0 |

TABLE 3

| | Extrudability | | Brazability | |
|---|---|---|---|---|
| Alloy | Critical extrusion rate ratio | Evaluation | Tensile strength after brazing (MPa) | Strength after brazing |
| A | 1.41 | Good | 75 | Good |
| B | 1.00 | Good | 115 | Good |
| C | 1.17 | Good | 100 | Good |
| D | 1.33 | Good | 80 | Good |
| E | 1.29 | Good | 83 | Good |
| F | 1.29 | Good | 80 | Good |
| G | 1.29 | Good | 80 | Good |
| H | 1.15 | Good | 84 | Good |
| I | 1.15 | Good | 81 | Good |
| J | 1.15 | Good | 84 | Good |
| K | 1.10 | Good | 84 | Good |
| L | 1.30 | Good | 82 | Good |

TABLE 4

| | Extrudability | | Brazability | |
|---|---|---|---|---|
| Alloy | Critical extrusion rate ratio | Evaluation | Tensile strength after brazing (MPa) | Strength after brazing |
| M | 1.42 | Good | 70 | Bad |
| N | 0.90 | Bad | 120 | Good |
| O | 0.95 | Bad | 90 | Good |
| P | 0.95 | Bad | 85 | Good |
| Q | 0.95 | Bad | 85 | Good |
| R | 0.95 | Bad | 87 | Good |
| S | 1.58 | Good | 60 | Bad |
| T | 1.00 | — | 75 | — |

TABLE 5

| | First-stage heat treatment | | Cooling to room temperature | Second-stage heat treatment | | Extrudability | |
|---|---|---|---|---|---|---|---|
| Alloy | Temperature (C. °) | Time (h) | before second-stage heat treatment | Temperature (C. °) | Time (h) | Critical extrusion rate ratio | Evaluation |
| C | 600 | 10 | — | — | | 1.17 | Good |
| D | 600 | 10 | — | — | | 1.33 | Good |
| C | 600 | 10 | None | 500 | 10 | 1.25 | Good |
| C | 600 | 10 | Cooled | 500 | 10 | 1.27 | Good |
| D | 600 | 10 | None | 500 | 10 | 1.45 | Good |

TABLE 6

| | First-stage heat treatment | | Cooling to room temperature | Second-stage heat treatment | | Extrudability | |
|---|---|---|---|---|---|---|---|
| Alloy | Temperature (C. °) | Time (h) | before second-stage heat treatment | Temperature (C. °) | Time (h) | Critical extrusion rate ratio | Evaluation |
| C | 600 | 2 | — | — | | 0.95 | Bad |
| C | 350 | 10 | — | — | | 0.90 | Bad |
| C | 600 | 1 | None | 500 | 2 | 0.85 | Bad |
| C | 500 | 10 | None | 450 | 10 | 0.90 | Bad |
| T | 600 | 10 | — | — | | 1.00 | — |

As shown in Table 3 and 4, Alloys A to L according to the present invention exhibited excellent extrudability and brazability. On the other hand, Alloys M to S that do not meet the requirements of the present invention exhibited inferior extrudability or brazability.

When homogenizing Alloys C and D according to the present invention under the conditions shown in Tables 5 and 6, excellent extrudability was obtained when homogenizing the alloy under the conditions (conditions shown in Table 5) according to the present invention. On the other hand, inferior extrudability was obtained when homogenizing the alloy under conditions that do not meet the requirements of the present invention.

As an aluminum alloy for a fin material, a slab of an aluminum alloy (Alloys a to 1) having a composition shown in Table 7 or an aluminum alloy (Alloys m to x) having a composition shown in Table 8 was cast. The slab was homogenized, hot-rolled, and cold-rolled to obtain a fin material having a thickness of 0.1 mm. The fin material was then corrugated (fin pitch: 3 mm, fin height: 7 mm). In Tables 7 and 8, a value that does not meet the requirements of the present invention is underlined.

TABLE 7

| Alloy | Composition (mass %) | | | | | |
|---|---|---|---|---|---|---|
| | Si | Fe | Cu | Mn | Zn | Others |
| a | 0.05 | 0.15 | 0 | 1.2 | 0.8 | |
| b | 0.05 | 0.15 | 0 | 1.2 | 3.0 | |
| c | 0.05 | 0.15 | 0 | 1.2 | 1.0 | |
| d | 0.05 | 0.15 | 0.15 | 1.2 | 2.5 | |
| e | 0.5 | 0.15 | 0 | 1.2 | 1.0 | |
| f | 0.5 | 0.15 | 0.15 | 1.2 | 2.5 | |
| g | 0.05 | 0.15 | 0 | 1.2 | 1.0 | Mg: 0.1 |
| h | 0.05 | 0.15 | 0 | 1.2 | 1.0 | Cr: 0.15 |
| i | 0.05 | 0.15 | 0 | 1.2 | 1.0 | Zr: 0.15 |
| j | 0.05 | 0.15 | 0 | 1.2 | 1.0 | Ti: 0.15 |
| k | 0.05 | 0.15 | 0 | 1.2 | 1.0 | In: 0.05 |
| l | 0.05 | 0.15 | 0 | 1.2 | 1.0 | S,: 0.05 |

TABLE 8

| Alloy | Composition (mass %) | | | | | |
|---|---|---|---|---|---|---|
| | Si | Fe | Cu | Mn | Zn | Others |
| m | 0.05 | 0.15 | 0 | 1.2 | 0.3 | |
| n | 0.05 | 0.15 | 0 | 1.2 | 3.5 | |
| o | 1.3 | 0.15 | 0 | 1.2 | 1.0 | |
| p | 0.05 | 0.15 | 0 | 2.0 | 1.0 | |
| q | 0.05 | 1.0 | 0 | 1.2 | 1.0 | |
| r | 0.05 | 0.15 | 0 | 1.2 | 1.0 | Mg: 0.6 |
| s | 0.05 | 0.15 | 0.5 | 1.2 | 1.0 | |
| t | 0.05 | 0.15 | 0 | 1.2 | 1.0 | Cr: 0.35 |
| u | 0.05 | 0.15 | 0 | 1.2 | 1.0 | Zr: 0.35 |
| v | 0.05 | 0.15 | 0 | 1.2 | 1.0 | Ti: 0.35 |
| w | 0.05 | 0.15 | 0 | 1.2 | 1.0 | In: 0.15 |
| x | 0.05 | 0.15 | 0 | 1.2 | 1.0 | Sn: 0.15 |

A coating material was prepared by adding an acrylic resin binder to a mixture of an Si powder and a $KZnF_3$ powder (the mixing ratio is shown in Tables 9 and 10). The coating material was applied to the surface of the above multi-port tube (aluminum alloy multi-port extruded tube for refrigerant tube) (indicated by the alloy reference symbol in Tables 9 and 10) by roll coating in an amount shown in Tables 9 and 10. The multi-port tube and the corrugated fin (indicated by the alloy reference symbol in Tables 9 and 10) were assembled (see Tables 9 and 10), and brazed to obtain a heat exchanger core.

A case where the heat exchanger core was produced without any problem was evaluated as "Good", and a case where a problem occurred when producing the heat exchanger core was evaluated as "Bad" (evaluation of heat exchanger core production). The results are shown in Table 9 and 10. The multi-port tube was homogenized at 600° C. for 10 hours. When brazing the multi-port tube and the fin, the multi-port tube and the fin were heated to 600° C. in a nitrogen gas atmosphere at an average temperature increase rate of 50° C./min, held for 3 minutes, and cooled to room temperature. The resulting heat exchanger core was subjected to the following tests 4, 5, 6, and 7.

TABLE 9

| Heat exchange core No. | Refrigerant tube Alloy | Coating | | | | Fin material Alloy | Problem during core production | Core production state |
|---|---|---|---|---|---|---|---|---|
| | | Si (%) | $KZnF_3$ (%) | Acrylic resin binder (%) | Amount (/m³) | | | |
| 1 | A | 20 | 60 | 20 | 13 | c | None | Good |
| 2 | B | 20 | 60 | 20 | 13 | c | None | Good |
| 3 | C | 20 | 60 | 20 | 13 | c | None | Good |
| 4 | D | 20 | 60 | 20 | 13 | c | None | Good |
| 5 | E | 20 | 60 | 20 | 13 | c | None | Good |
| 6 | F | 20 | 60 | 20 | 13 | c | None | Good |
| 7 | G | 20 | 60 | 20 | 13 | c | None | Good |
| 8 | H | 20 | 60 | 20 | 13 | c | None | Good |
| 9 | I | 20 | 60 | 20 | 13 | c | None | Good |
| 10 | J | 20 | 60 | 20 | 13 | c | None | Good |
| 11 | K | 20 | 60 | 20 | 13 | c | None | Good |
| 12 | L | 20 | 60 | 20 | 13 | c | None | Good |
| 13 | D | 20 | 60 | 20 | 13 | a | None | Good |
| 14 | D | 20 | 60 | 20 | 13 | b | None | Good |
| 15 | D | 20 | 60 | 20 | 13 | d | None | Good |
| 16 | D | 20 | 60 | 20 | 13 | e | None | Good |
| 17 | D | 20 | 60 | 20 | 13 | f | None | Good |
| 18 | D | 20 | 60 | 20 | 13 | g | None | Good |
| 19 | D | 20 | 60 | 20 | 13 | h | None | Good |
| 20 | D | 20 | 60 | 20 | 13 | i | None | Good |
| 21 | D | 20 | 60 | 20 | 13 | j | None | Good |
| 22 | D | 20 | 60 | 20 | 13 | k | None | Good |
| 23 | D | 20 | 60 | 20 | 13 | l | None | Good |
| 24 | D | 20 | 60 | 10 | 13 | c | None | Good |

TABLE 10

| Heat exchange core No. | Refrigerant tube Alloy | Coating Si (%) | Coating $KZnF_3$ (%) | Coating Acrylic resin binder (%) | Coating Amount (g/m$^3$) | Fin material Alloy | Problem during core production | Core production state |
|---|---|---|---|---|---|---|---|---|
| 25 | D | 20 | 60 | 20 | 13 | m | None | Good |
| 26 | D | 20 | 60 | 20 | 13 | n | None | Good |
| 27 | D | 20 | 60 | 20 | 13 | o | Fin was melted during brazing | Bad |
| 28 | D | 20 | 60 | 20 | 13 | p | Fin broke during forming | Bad |
| 29 | D | 20 | 60 | 20 | 13 | q | None | Good |
| 30 | D | 20 | 60 | 20 | 13 | r | Fin was not bonded during brazing | Bad |
| 31 | D | 20 | 60 | 20 | 13 | s | None | Good |
| 32 | D | 20 | 60 | 20 | 13 | t | Fin broke during forming | Bad |
| 33 | D | 20 | 60 | 20 | 13 | u | Fin broke during forming | Bad |
| 34 | D | 20 | 60 | 20 | 13 | v | Fin broke during forming | Bad |
| 35 | D | 20 | 60 | 20 | 13 | w | None | Good |
| 36 | D | 20 | 60 | 20 | 13 | x | None | Good |
| 37 | D | 20 | 60 | 20 | 4 | c | Fin was not bonded during brazing | Bad |
| 38 | D | 20 | 60 | 20 | 25 | c | Core dimensions decreased | Bad |
| 39 | D | 24 | 73 | 3 | 13 | c | Coating separation | Bad |
| 40 | D | 16 | 49 | 35 | 13 | c | Defective brazing | Bad |
| 41 | D | 5 | 75 | 20 | 13 | c | Fin was not bonded during brazing | Bad |
| 42 | D | 45 | 35 | 20 | 13 | c | Defective brazing | Bad |
| 43 | T | 20 | 60 | 20 | 13 | c | None | Good |
| 44 | T | 10 | 85 | 5 | 20 | c | None | Good |

Test 4

The heat exchanger core was subjected to a leakage test to determine the presence or absence of leakage due to defective brazing at the joint between the header and the refrigerant tube. The results are shown in Tables 11 and 12.

Test 5

The heat exchanger core was heated at 150° C. for 120 hours (high-temperature usage simulation), and subjected to an intergranular corrosion test in accordance with ISO 11846 (Method B). The results are shown in Tables 13 and 14.

Test 6

The Zn concentration and the Zn diffusion depth of the surface of the refrigerant tube of the heat exchanger core, the potentials of the surface and the deep area of the refrigerant tube, the potential difference between the surface and the deep area of the refrigerant tube, the potential of the fin material, the potential difference between the surface of the refrigerant tube and the fin material, and the potential difference between the deep area of the refrigerant tube and the fin material were measured. The Zn concentration and the Zn diffusion depth of the surface of the refrigerant tube were determined by filling the cross section of the core with a resin, and calculating the Zn concentration and the Zn diffusion depth from the EPMA line analysis results in the thickness direction. A depth at which the Zn concentration was 0.01% was taken as the Zn diffusion depth. The potential of the surface of the refrigerant tube and the potential of the surface of the fin material were measured directly after brazing. The potential of the deep area of the refrigerant tube was determined by facing the refrigerant tube to a depth of 150 μm from the surface, and measuring the potential of an area in which Zn diffusion did not occur. When measuring the potential of the material, the material was immersed in a 5% NaCl aqueous solution (the pH was adjusted to 3 using acetic acid) for 24 hours. The average value of stable measured values obtained after immersing the material for 10 hours or more was employed. A saturated calomel electrode was used as a reference electrode. The results are shown in Tables 15 and 16.

Test 7

The heat exchanger core was subjected to the SWAAT test and the CCT test specified by ASTM-G85-Annex A3 for 1000 hours. In the CCT test, a 5% salt solution (the pH was adjusted to 3 using acetic acid) was used as a test solution. After spraying the test solution onto the heat exchanger core at 35° C. (atmospheric temperature) for 2 hours, the heat exchanger core was dried at 60° C. for 4 hours, and wetted at 50° C. for 2 hours at a relative humidity of 95% or more. The above cycle was repeated. The maximum corrosion depth of the refrigerant tube (tube) and the corrosion state of the fin after the test are shown in Tables 17 and 18. A case where the maximum corrosion depth of the refrigerant tube was 0.05 mm or less was evaluated as "Excellent", a case where the maximum corrosion depth of the refrigerant tube was more than 0.05 mm and 0.10 mm or less was evaluated as "Good", a case where the maximum corrosion depth of the refrigerant tube was more than 0.10 mm and 0.20 mm or less was evaluated as "Fair", and a case where the maximum corrosion depth of the refrigerant tube was more than 0.20 mm was evaluated as "Bad". A case where the fin was corroded to only a small extent was evaluated as "Excellent", a case where the fin was slightly corroded was evaluated as "Good", a case where the fin was corroded to some extent was evaluated as "Fair", and a case where the fin was significantly corroded was evaluated as "Bad".

TABLE 11

| Heat exchange core No. | Refrigerant tube Alloy | Coating Si (%) | Coating $KZnF_3$ (%) | Coating Acrylic resin binder (%) | Coating Amount (g/m$^3$) | Fin material Alloy | Leakage at header/refrigerant tube joint |
|---|---|---|---|---|---|---|---|
| 1 | A | 20 | 60 | 20 | 13 | c | None |
| 2 | B | 20 | 60 | 20 | 13 | c | None |

TABLE 11-continued

| Heat exchange core No. | Refrigerant tube Alloy | Coating Si (%) | Coating $KZnF_3$ (%) | Coating Acrylic resin binder (%) | Coating Amount (g/m$^3$) | Fin material Alloy | Leakage at header/refrigerant tube joint |
|---|---|---|---|---|---|---|---|
| 3 | C | 20 | 60 | 20 | 13 | c | None |
| 4 | D | 20 | 60 | 20 | 13 | c | None |
| 5 | E | 20 | 60 | 20 | 13 | c | None |
| 6 | F | 20 | 60 | 20 | 13 | c | None |
| 7 | G | 20 | 60 | 20 | 13 | c | None |
| 8 | H | 20 | 60 | 20 | 13 | c | None |
| 9 | I | 20 | 60 | 20 | 13 | c | None |
| 10 | J | 20 | 60 | 20 | 13 | c | None |
| 11 | K | 20 | 60 | 20 | 13 | c | None |
| 12 | L | 20 | 60 | 20 | 13 | c | None |
| 13 | D | 20 | 60 | 20 | 13 | a | None |
| 14 | D | 20 | 60 | 20 | 13 | b | None |
| 15 | D | 20 | 60 | 20 | 13 | d | None |
| 16 | D | 20 | 60 | 20 | 13 | e | None |
| 17 | D | 20 | 60 | 20 | 13 | f | None |
| 18 | D | 20 | 60 | 20 | 13 | g | None |
| 19 | D | 20 | 60 | 20 | 13 | h | None |
| 20 | D | 20 | 60 | 20 | 13 | i | None |
| 21 | D | 20 | 60 | 20 | 13 | j | None |
| 22 | D | 20 | 60 | 20 | 13 | k | None |
| 23 | D | 20 | 60 | 20 | 13 | l | None |
| 24 | D | 20 | 60 | 10 | 13 | c | None |

TABLE 12

| Heat exchange core No. | Refrigerant tube Alloy | Coating Si (%) | Coating $KZnF_3$ (%) | Coating Acrylic resin binder (%) | Coating Amount (g/m$^3$) | Fin material Alloy | Leakage at header/refrigerant tube joint |
|---|---|---|---|---|---|---|---|
| 25 | D | 20 | 60 | 20 | 13 | m | None |
| 26 | D | 20 | 60 | 20 | 13 | n | None |
| 27 | D | 20 | 60 | 20 | 13 | o | None |
| 28 | D | 20 | 60 | 20 | 13 | p | None |
| 29 | D | 20 | 60 | 20 | 13 | q | None |
| 30 | D | 20 | 60 | 20 | 13 | r | None |
| 31 | D | 20 | 60 | 20 | 13 | s | None |
| 32 | D | 20 | 60 | 20 | 13 | t | None |
| 33 | D | 20 | 60 | 20 | 13 | u | None |
| 34 | D | 20 | 60 | 20 | 13 | v | None |
| 35 | D | 20 | 60 | 20 | 13 | w | None |
| 36 | D | 20 | 60 | 20 | 13 | x | None |
| 37 | D | 20 | 60 | 20 | 4 | c | None |
| 38 | D | 20 | 60 | 20 | 25 | c | None |
| 39 | D | 24 | 73 | 3 | 13 | c | None |
| 40 | D | 16 | 49 | 35 | 13 | c | None |
| 41 | D | 5 | 75 | 20 | 13 | c | None |
| 42 | D | 45 | 35 | 20 | 13 | c | None |
| 43 | T | 20 | 60 | 20 | 13 | c | あり |
| 44 | T | 10 | 85 | 5 | 20 | c | あり |

TABLE 13

| Heat exchange core No. | Refrigerant tube Alloy | Coating Si (%) | Coating $KZnF_3$ (%) | Coating Acrylic resin binder (%) | Coating Amount (g/m$^3$) | Fin material Alloy | Intergranular corrosion |
|---|---|---|---|---|---|---|---|
| 1 | A | 20 | 60 | 20 | 13 | c | None |
| 2 | B | 20 | 60 | 20 | 13 | c | None |
| 3 | C | 20 | 60 | 20 | 13 | c | None |
| 4 | D | 20 | 60 | 20 | 13 | c | None |
| 5 | E | 20 | 60 | 20 | 13 | c | None |
| 6 | F | 20 | 60 | 20 | 13 | c | None |
| 7 | G | 20 | 60 | 20 | 13 | c | None |
| 8 | H | 20 | 60 | 20 | 13 | c | None |
| 9 | I | 20 | 60 | 20 | 13 | c | None |
| 10 | J | 20 | 60 | 20 | 13 | c | None |
| 11 | K | 20 | 60 | 20 | 13 | c | None |
| 12 | L | 20 | 60 | 20 | 13 | c | None |

TABLE 13-continued

| Heat exchange core No. | Refrigerant tube Alloy | Coating Si (%) | Coating $KZnF_3$ (%) | Coating Acrylic resin binder (%) | Coating Amount (g/m$^3$) | Fin material Alloy | Intergranular corrosion |
|---|---|---|---|---|---|---|---|
| 13 | D | 20 | 60 | 20 | 13 | a | None |
| 14 | D | 20 | 60 | 20 | 13 | b | None |
| 15 | D | 20 | 60 | 20 | 13 | d | None |
| 16 | D | 20 | 60 | 20 | 13 | e | None |
| 17 | D | 20 | 60 | 20 | 13 | f | None |
| 18 | D | 20 | 60 | 20 | 13 | g | None |
| 19 | D | 20 | 60 | 20 | 13 | h | None |
| 20 | D | 20 | 60 | 20 | 13 | i | None |
| 21 | D | 20 | 60 | 20 | 13 | j | None |
| 22 | D | 20 | 60 | 20 | 13 | k | None |
| 23 | D | 20 | 60 | 20 | 13 | l | None |
| 24 | D | 20 | 60 | 10 | 13 | c | None |

TABLE 14

| Heat exchange core No. | Refrigerant tube Alloy | Coating Si (%) | Coating $KZnF_3$ (%) | Coating Acrylic resin binder (%) | Coating Amount (g/m$^3$) | Fin material Alloy | Intergranular corrosion |
|---|---|---|---|---|---|---|---|
| 25 | D | 20 | 60 | 20 | 13 | m | None |
| 26 | D | 20 | 60 | 20 | 13 | n | None |
| 27 | D | 20 | 60 | 20 | 13 | o | None |
| 28 | D | 20 | 60 | 20 | 13 | p | None |
| 29 | D | 20 | 60 | 20 | 13 | q | None |
| 30 | D | 20 | 60 | 20 | 13 | r | None |
| 31 | D | 20 | 60 | 20 | 13 | s | None |
| 32 | D | 20 | 60 | 20 | 13 | t | None |
| 33 | D | 20 | 60 | 20 | 13 | u | None |
| 34 | D | 20 | 60 | 20 | 13 | v | None |
| 35 | D | 20 | 60 | 20 | 13 | w | None |
| 36 | D | 20 | 60 | 20 | 13 | x | None |
| 37 | D | 20 | 60 | 20 | 4 | c | None |
| 38 | D | 20 | 60 | 20 | 25 | c | None |
| 39 | D | 24 | 73 | 3 | 13 | c | None |
| 40 | D | 16 | 49 | 35 | 13 | c | None |
| 41 | D | 5 | 75 | 20 | 13 | c | None |
| 42 | D | 45 | 35 | 20 | 13 | c | None |
| 43 | T | 20 | 60 | 20 | 13 | c | Significant |
| 44 | T | 10 | 85 | 5 | 20 | c | Significant |

TABLE 15

| Heat exchange core No. | Refrigerant tube Alloy | Coating Si (%) | Coating $KZnF_3$ (%) | Coating Acrylic resin binder (%) | Coating Amount (g/m$^3$) | Fin material Alloy | Refrigerant tube Zn Surface concentration (mass %) | Refrigerant tube Zn Diffusion depth (μm) | Refrigerant tube potential Surface (mV vs. SCE) | Refrigerant tube potential Deep area (mV vs. SCE) | Refrigerant tube potential Potential difference (mV) | Fin material potential (mV vs. SCE) | Tube surface/fin material potential difference (mV) | Tube deep area/fin material potential difference (mV) |
|---|---|---|---|---|---|---|---|---|---|---|---|---|---|---|
| 1 | A | 20 | 60 | 20 | 13 | c | 1.5 | 100 | −845 | −750 | 95 | −780 | −65 | 30 |
| 2 | B | 20 | 60 | 20 | 13 | c | 1.5 | 100 | −815 | −720 | 95 | −780 | −35 | 60 |
| 3 | C | 20 | 60 | 20 | 13 | c | 1.5 | 100 | −825 | −730 | 95 | −780 | −45 | 50 |
| 4 | D | 20 | 60 | 20 | 13 | c | 1.5 | 100 | −835 | −740 | 95 | −780 | −55 | 40 |
| 5 | E | 20 | 60 | 20 | 13 | c | 1.5 | 100 | −835 | −740 | 95 | −780 | −55 | 40 |
| 6 | F | 20 | 60 | 20 | 13 | c | 1.5 | 100 | −835 | −740 | 95 | −780 | −55 | 40 |
| 7 | G | 20 | 60 | 20 | 13 | c | 1.5 | 100 | −835 | −740 | 95 | −780 | −55 | 40 |
| 8 | H | 20 | 60 | 20 | 13 | c | 1.5 | 100 | −835 | −740 | 95 | −780 | −55 | 40 |
| 9 | I | 20 | 60 | 20 | 13 | c | 1.5 | 100 | −835 | −740 | 95 | −780 | −55 | 40 |
| 10 | J | 20 | 60 | 20 | 13 | c | 1.5 | 100 | −835 | −740 | 95 | −780 | −55 | 40 |
| 11 | K | 20 | 60 | 20 | 13 | c | 1.5 | 100 | −835 | −740 | 95 | −780 | −55 | 40 |
| 12 | L | 20 | 60 | 20 | 13 | c | 1.5 | 100 | −830 | −730 | 100 | −780 | −50 | 50 |
| 13 | D | 20 | 60 | 20 | 13 | a | 1.5 | 100 | −835 | −740 | 95 | −760 | −75 | 20 |
| 14 | D | 20 | 60 | 20 | 13 | b | 1.5 | 100 | −835 | −740 | 95 | −900 | 65 | 160 |
| 15 | D | 20 | 60 | 20 | 13 | d | 1.5 | 100 | −835 | −740 | 95 | −800 | −35 | 60 |
| 16 | D | 20 | 60 | 20 | 13 | e | 1.5 | 100 | −835 | −740 | 95 | −770 | −65 | 30 |
| 17 | D | 20 | 60 | 20 | 13 | f | 1.5 | 100 | −835 | −740 | 95 | −790 | −45 | 50 |
| 18 | D | 20 | 60 | 20 | 13 | g | 1.5 | 100 | −835 | −740 | 95 | −780 | −55 | 40 |
| 19 | D | 20 | 60 | 20 | 13 | h | 1.5 | 100 | −835 | −740 | 95 | −780 | −55 | 40 |

TABLE 15-continued

| Heat exchange core No. | Refrigerant tube Alloy | Coating Si (%) | Coating $KZnF_3$ (%) | Coating Acrylic resin binder (%) | Coating Amount (g/m$^3$) | Fin material Alloy | Refrigerant tube Zn Surface concentration (mass %) | Refrigerant tube Zn Diffusion depth (μm) | Refrigerant tube potential Surface (mV vs. SCE) | Refrigerant tube potential Deep area (mV vs. SCE) | Refrigerant tube potential Potential difference (mV) | Fin material potential (mV vs. SCE) | Tube surface/fin material potential difference (mV) | Tube deep area/fin material potential difference (mV) |
|---|---|---|---|---|---|---|---|---|---|---|---|---|---|---|
| 20 | D | 20 | 60 | 20 | 13 | i | 1.5 | 100 | −835 | −740 | 95 | −780 | −55 | 40 |
| 21 | D | 20 | 60 | 20 | 13 | j | 1.5 | 100 | −835 | −740 | 95 | −780 | −55 | 40 |
| 22 | D | 20 | 60 | 20 | 13 | k | 1.5 | 100 | −835 | −740 | 95 | −820 | −15 | 80 |
| 23 | D | 20 | 60 | 20 | 13 | l | 1.5 | 100 | −835 | −740 | 95 | −820 | −15 | 80 |
| 24 | D | 20 | 60 | 10 | 13 | c | 1.5 | 100 | −835 | −740 | 95 | −780 | −55 | 40 |

TABLE 16

| Heat exchange core No. | Refrigerant tube Alloy | Coating Si (%) | Coating $KZnF_3$ (%) | Coating Acrylic resin binder (%) | Coating Amount (g/m$^3$) | Fin material Alloy | Refrigerant tube Zn Surface concentration (mass %) | Refrigerant tube Zn Diffusion depth (μm) | Refrigerant tube potential Surface (mV vs. SCE) | Refrigerant tube potential Deep area (mV vs. SCE) | Refrigerant tube potential Potential difference (mV) | Fin material potential (mV vs. SCE) | Tube surface/fin material potential difference (mV) | Tube deep area/fin material potential difference (mV) |
|---|---|---|---|---|---|---|---|---|---|---|---|---|---|---|
| 25 | D | 20 | 60 | 20 | 13 | m | 1.5 | 100 | −835 | −740 | 95 | −730 | −105 | −10 |
| 26 | D | 20 | 60 | 20 | 13 | n | 1.5 | 100 | −835 | −740 | 95 | −950 | 115 | 210 |
| 27 | D | 20 | 60 | 20 | 13 | o | 1.5 | 100 | −835 | −740 | 95 | −750 | −85 | 10 |
| 28 | D | 20 | 60 | 20 | 13 | p | 1.5 | 100 | −835 | −740 | 95 | −720 | −115 | −20 |
| 29 | D | 20 | 60 | 20 | 13 | q | 1.5 | 100 | −835 | −740 | 95 | −780 | −55 | 40 |
| 30 | D | 20 | 60 | 20 | 13 | r | 1.5 | 100 | −835 | −740 | 95 | −780 | −55 | 40 |
| 31 | D | 20 | 60 | 20 | 13 | s | 1.5 | 100 | −835 | −740 | 95 | −700 | −135 | −40 |
| 32 | D | 20 | 60 | 20 | 13 | t | 1.5 | 100 | −835 | −740 | 95 | −780 | −55 | 40 |
| 33 | D | 20 | 60 | 20 | 13 | u | 1.5 | 100 | −835 | −740 | 95 | −780 | −55 | 40 |
| 34 | D | 20 | 60 | 20 | 13 | v | 1.5 | 100 | −835 | −740 | 95 | −780 | −55 | 40 |
| 35 | D | 20 | 60 | 20 | 13 | w | 1.5 | 100 | −835 | −740 | 95 | −820 | −15 | 80 |
| 36 | D | 20 | 60 | 20 | 13 | x | 1.5 | 100 | −835 | −740 | 95 | −820 | −15 | 80 |
| 37 | D | 20 | 60 | 20 | 4 | c | 0.2 | 45 | −760 | −740 | 20 | −780 | 20 | 40 |
| 38 | D | 20 | 60 | 20 | 25 | c | 2.4 | 140 | −880 | −740 | 140 | −780 | −100 | 40 |
| 39 | D | 24 | 73 | 3 | 13 | c | 1.7 | 105 | −845 | −740 | 105 | −780 | −65 | 40 |
| 40 | D | 16 | 49 | 35 | 13 | c | 1.0 | 80 | −780 | −740 | 40 | −780 | 0 | 40 |
| 41 | D | 5 | 75 | 20 | 13 | c | 1.8 | 110 | −850 | −740 | 110 | −780 | −70 | 40 |
| 42 | D | 45 | 35 | 20 | 13 | c | 0.5 | 60 | −770 | −740 | 30 | −780 | 10 | 40 |
| 43 | T | 20 | 60 | 20 | 13 | c | 1.5 | 100 | −710 | −710 | 0 | −780 | 70 | 70 |
| 44 | T | 10 | 85 | 5 | 20 | c | 2.5 | 145 | −720 | −710 | 10 | −780 | 60 | 70 |

TABLE 17

| Heat exchange core No. | Refrigerant tube Alloy | Coating Si (%) | Coating $KZnF_3$ (%) | Coating Acrylic resin binder (%) | Coating Amount (g/m$^3$) | Fin material Alloy | SWAAT-1000 h Maximum corrosion depth of tube (mm) | SWAAT-1000 h Corrosion of fin | CCT-1000 h Maximum corrosion depth of tube (mm) | CCT-1000 h Corrosion of fin |
|---|---|---|---|---|---|---|---|---|---|---|
| 1 | A | 20 | 60 | 20 | 13 | c | 0.05 Excellent | Excellent | 0.05 Excellent | Excellent |
| 2 | B | 20 | 60 | 20 | 13 | c | 0.05 Excellent | Excellent | 0.05 Excellent | Excellent |
| 3 | C | 20 | 60 | 20 | 13 | c | 0.05 Excellent | Excellent | 0.05 Excellent | Excellent |
| 4 | D | 20 | 60 | 20 | 13 | c | 0.05 Excellent | Excellent | 0.05 Excellent | Excellent |
| 5 | E | 20 | 60 | 20 | 13 | c | 0.03 Excellent | Excellent | 0.03 Excellent | Excellent |
| 6 | F | 20 | 60 | 20 | 13 | c | 0.03 Excellent | Excellent | 0.03 Excellent | Excellent |
| 7 | G | 20 | 60 | 20 | 13 | c | 0.04 Excellent | Excellent | 0.04 Excellent | Excellent |
| 8 | H | 20 | 60 | 20 | 13 | c | 0.03 Excellent | Excellent | 0.03 Excellent | Excellent |
| 9 | I | 20 | 60 | 20 | 13 | c | 0.03 Excellent | Excellent | 0.03 Excellent | Excellent |
| 10 | J | 20 | 60 | 20 | 13 | c | 0.03 Excellent | Excellent | 0.03 Excellent | Excellent |
| 11 | K | 20 | 60 | 20 | 13 | c | 0.03 Excellent | Excellent | 0.03 Excellent | Excellent |
| 12 | L | 20 | 60 | 20 | 13 | c | 0.05 Excellent | Excellent | 0.05 Excellent | Excellent |
| 13 | D | 20 | 60 | 20 | 13 | a | 0.05 Excellent | Excellent | 0.05 Excellent | Excellent |
| 14 | D | 20 | 60 | 20 | 13 | b | 0.05 Excellent | Good | 0.05 Excellent | Excellent |
| 15 | D | 20 | 60 | 20 | 13 | d | 0.05 Excellent | Excellent | 0.05 Excellent | Excellent |
| 16 | D | 20 | 60 | 20 | 13 | e | 0.05 Excellent | Excellent | 0.05 Excellent | Excellent |
| 17 | D | 20 | 60 | 20 | 13 | f | 0.05 Excellent | Excellent | 0.05 Excellent | Excellent |
| 18 | D | 20 | 60 | 20 | 13 | g | 0.05 Excellent | Excellent | 0.05 Excellent | Excellent |
| 19 | D | 20 | 60 | 20 | 13 | h | 0.05 Excellent | Excellent | 0.05 Excellent | Excellent |
| 20 | D | 20 | 60 | 20 | 13 | i | 0.05 Excellent | Excellent | 0.05 Excellent | Excellent |
| 21 | D | 20 | 60 | 20 | 13 | j | 0.05 Excellent | Excellent | 0.05 Excellent | Excellent |

TABLE 17-continued

| Heat exchange core No. | Refrigerant tube Alloy | Coating Si (%) | Coating KZnF$_3$ (%) | Coating Acrylic resin binder (%) | Coating Amount (g/m$^3$) | Fin material Alloy | SWAAT-1000 h Maximum corrosion depth of tube (mm) | | SWAAT-1000 h Corrosion of fin | CCT-1000 h Maximum corrosion depth of tube (mm) | | CCT-1000 h Corrosion of fin |
|---|---|---|---|---|---|---|---|---|---|---|---|---|
| 22 | D | 20 | 60 | 20 | 13 | k | 0.05 | Excellent | Excellent | 0.05 | Excellent | Excellent |
| 23 | D | 20 | 60 | 20 | 13 | l | 0.05 | Excellent | Excellent | 0.05 | Excellent | Excellent |
| 24 | D | 20 | 60 | 10 | 13 | c | 0.05 | Excellent | Excellent | 0.05 | Excellent | Excellent |

TABLE 18

| Heat exchange core No. | Refrigerant tube Alloy | Coating Si (%) | Coating KZnF$_3$ (%) | Coating Acrylic resin binder (%) | Coating Amount (g/m$^3$) | Fin material Alloy | SWAAT-1000 h Maximum corrosion depth of tube (mm) | | SWAAT-1000 h Corrosion of fin | CCT-1000 h Maximum corrosion depth of tube (mm) | | CCT-1000 h Corrosion of fin |
|---|---|---|---|---|---|---|---|---|---|---|---|---|
| 25 | D | 20 | 60 | 20 | 13 | m | 0.30 | Bad | Excellent | 0.30 | Bad | Excellent |
| 26 | D | 20 | 60 | 20 | 13 | n | 0.05 | Excellent | Bad | 0.05 | Excellent | Bad |
| 27 | D | 20 | 60 | 20 | 13 | o | 0.05 | Excellent | Excellent | 0.05 | Excellent | Excellent |
| 28 | D | 20 | 60 | 20 | 13 | p | 0.30 | Bad | Excellent | 0.30 | Bad | Excellent |
| 29 | D | 20 | 60 | 20 | 13 | q | 0.05 | Excellent | Bad | 0.05 | Excellent | Bad |
| 30 | D | 20 | 60 | 20 | 13 | r | 0.05 | Excellent | Excellent | 0.05 | Excellent | Excellent |
| 31 | D | 20 | 60 | 20 | 13 | s | 0.30 | Bad | Bad | 0.30 | Bad | Bad |
| 32 | D | 20 | 60 | 20 | 13 | t | 0.05 | Excellent | Excellent | 0.05 | Excellent | Excellent |
| 33 | D | 20 | 60 | 20 | 13 | u | 0.05 | Excellent | Excellent | 0.05 | Excellent | Excellent |
| 34 | D | 20 | 60 | 20 | 13 | v | 0.05 | Excellent | Excellent | 0.05 | Excellent | Excellent |
| 35 | D | 20 | 60 | 20 | 13 | w | 0.05 | Excellent | Bad | 0.05 | Excellent | Bad |
| 36 | D | 20 | 60 | 20 | 13 | x | 0.05 | Excellent | Bad | 0.05 | Excellent | Bad |
| 37 | D | 20 | 60 | 20 | 4 | c | 0.11 | Fair | Good | 0.30 | Bad | Good |
| 38 | D | 20 | 60 | 20 | 25 | c | 0.05 | Excellent | Excellent | 0.05 | Excellent | Excellent |
| 39 | D | 24 | 73 | 3 | 13 | c | 0.05 | Excellent | Excellent | 0.05 | Excellent | Excellent |
| 40 | D | 16 | 49 | 35 | 13 | c | 0.05 | Excellent | Good | 0.21 | Bad | Good |
| 41 | D | 5 | 75 | 20 | 13 | c | 0.05 | Excellent | Excellent | 0.05 | Excellent | Excellent |
| 42 | D | 45 | 35 | 20 | 13 | c | 0.08 | Good | Good | 0.30 | Bad | Good |
| 43 | T | 20 | 60 | 20 | 13 | c | 0.30 | Bad | Good | 0.30 | Bad | Good |
| 44 | T | 10 | 85 | 5 | 20 | c | 0.22 | Bad | Good | 0.30 | Bad | Good |

The results of Tests 4 to 7 were as follows. The heat exchanger cores No. 1 to 24 produced according to the present invention showed no leakage at the joint between the header and the refrigerant tube when subjected to the leakage test after brazing. On the other hand, the heat exchanger cores No. 43 and 44 using Alloy T having a low Mn content as the refrigerant tube aluminum alloy showed leakage.

The heat exchanger cores No. 1 to 24 produced according to the present invention showed no intergranular corrosion. On the other hand, the heat exchanger cores No. 43 and 44 using Alloy T containing Cu as the refrigerant tube aluminum alloy showed significant intergranular corrosion.

In the heat exchanger cores No. 1 to 24 produced according to the present invention, a sufficient Zn diffusion layer was formed in the surface of the refrigerant tube. Therefore, the surface of the refrigerant tube had a potential lower than that of the deep area of the refrigerant tube. The potential difference between the surface and the deep area of the refrigerant tube was 95 to 100 mV. The potential of the fin material was also lower than that of the deep area of the refrigerant tube. A sufficient Zn diffusion layer was not formed in the surface of the refrigerant tube in some of the heat exchanger cores No. 25 to 44 produced under conditions that do not meet the requirements of the present invention. In this case, a sufficient potential difference was not obtained between the surface and the deep area of the refrigerant tube. In the heat exchanger cores No. 43 and 44 using Alloy T containing Cu as the refrigerant tube aluminum alloy, since the potential-decreasing effect of Zn was counterbalanced, the surface of the refrigerant tube had a potential equal to or slightly lower than that of the deep area of the refrigerant tube, although a sufficient Zn diffusion layer was formed.

When subjecting the heat exchanger cores No. 1 to 24 produced according to the present invention to the SWAAT test, the maximum corrosion depth was small (i.e., excellent corrosion resistance was obtained) since a sufficient potential difference was obtained between the surface and the deep area of the refrigerant tube. In the SWAAT test, since the fin exhibits a sacrificial anode effect, corrosion of the fin material differs depending on the potential difference between the surface of the refrigerant tube and the fin material. In the heat exchanger cores No. 1 to 24 produced according to the present invention, the fin material was corroded to no or only a small extent due to an appropriate potential difference between the surface of the refrigerant tube and the fin material. Moreover, the potential of the fin material was lower than that of the deep area of the refrigerant tube. Therefore, the fin material did not accelerate corrosion of the refrigerant tube as a cathode.

With regard to the heat exchanger cores No. 25 to 44 produced under conditions that do not meet the requirements of the present invention, the maximum corrosion depth was large in the heat exchanger cores No. 25, 28, 31, 37, 43, and 44 in which a sufficient potential difference was not obtained between the surface and the deep area of the refrigerant tube, or the potential of the fin material was higher than that of the deep area of the refrigerant tube. The fin of Heat exchanger core No. 26 using Alloy n having a high Zn content as the fin material showed significant corrosion since the potential of the fin material was significant lower than that of the surface of the refrigerant tube. In the heat exchanger cores No. 29, 31, 35, and 36 using Alloy q having a high Fe content, Alloy s having a high Cu content, Alloy w having a high In content, or Alloy x having a high Sn content as the fin material, the fin showed significant corrosion due to inferior self-corrosion resistance.

When subjecting the heat exchanger cores No. 1 to 24 produced according to the present invention to the CCT test (the CCT test is similar to the actual environment due to the drying step; however, the fin may not exhibit a sacrificial anode effect), the maximum corrosion depth of the refrigerant tube was small (i.e., excellent corrosion resistance was obtained) since a sufficient potential difference was obtained between the surface and the deep area of the refrigerant tube. The fin material was corroded to no or only a small extent.

Regarding the heat exchanger cores No. 25 to 44 produced under conditions that do not meet the requirements of the present invention, the maximum corrosion depth of the refrigerant tube was large when the potential difference between the surface and the deep area of the refrigerant tube was insufficient. The same tendency as that of the SWAAT test was observed for corrosion of the fin material. The heat exchanger cores No. 27, 30, 32-34, 38, 39, and 41 showed excellent corrosion resistance results. However, a problem occurred when producing the heat exchanger core (see Table 12).

Obviously, numerous modifications and variations of the present invention are possible in the light of the above teachings. It is therefore to be understood that within the scope of the appended claims, the invention may be practised otherwise than as specifically described herein.

What is claimed is:

1. An aluminum alloy heat exchanger comprising a coated aluminum alloy extruded refrigerant tube having an aluminum alloy bare fin made of an Al—Mn—Zn alloy and brazed thereto, the aluminum alloy extruded refrigerant tube comprising 0.6-1.7 mass % of Mn, less than 0.05 mass % of Cu, less than 0.10 mass % Si and the balance being Al and unavoidable impurities, the coating on the aluminum alloy extruded refrigerant tube comprising a mixture of Si powder, a Zn-containing compound flux powder and a binder, a mixing ratio of the Si powder to the Zn-containing compound flux powder being 10:90-40:60, the binder being present in an amount of 5-40% based on the total amount of the coating, the coating being present on an outer surface of the refrigerant tube such that the total amount of Si powder and Zn-containing compound flux powder is 5-30 g/m2, the refrigerant tube having a surface and an area underlying the diffusion depth of Si and Zn, wherein the surface of the refrigerant tube subjected to brazing has a potential lower than the area of the refrigerant tube that is underlying the diffusion depth of Si and Zn by 20-200 mV, both the fin and the area of the refrigerant tube subjected to brazing having a potential, the potential of the fin being lower than the potential of the area of the refrigerant tube underlying the depth of Si and Zn.

2. The aluminum alloy heat exchanger according to claim 1, wherein the aluminum alloy extruded refrigerant tube further comprises at least one of 0.30 mass % or less of Ti, 0.10 mass % or less of Sr, and 0.3 mass % or less of Zr.

3. The aluminum alloy heat exchanger according to claim 1, wherein the Zn-containing compound flux powder is $KZnF_3$.

4. The aluminum alloy heat exchanger according to claim 1, wherein the Al—Mn—Zn alloy comprises 0.1 to 1.8 mass % of Mn, 0.8 to 3.0 mass % of Zn, and at least one of 0.1 to 1.2 mass % of Si, 0.01 to 0.8 mass % of Fe, 0.05 to 0.5 mass % of Mg, 0.3 mass % or less of Cu, 0.3 mass % or less of Cr, 0.3 mass % or less of Zr, and 0.3 mass % or less of Ti, with the balance being Al and unavoidable impurities.

5. The aluminum alloy heat exchanger according to claim 4, wherein the Al—Mn—Zn alloy further comprises at least one of 0.001 to 0.10 mass % of In and 0.001 to 0.10 mass % of Sn.

* * * * *